US011809418B2

(12) United States Patent
Vanhooser (10) Patent No.: US 11,809,418 B2
(45) Date of Patent: *Nov. 7, 2023

(54) APPROACHES FOR GENERATING QUERIES (71) Applicant: Palantir Technologies Inc., Denver, CO (US)

(72) Inventor: Shelby Vanhooser, Washington, DC (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/706,973

(22) Filed: Mar. 29, 2022

(65) Prior Publication Data
US 2022/0215020 A1 Jul. 7, 2022

Related U.S. Application Data (63) Continuation of application No. 16/408,333, filed on May 9, 2019, now Pat. No. 11,288,264.

(60) Provisional application No. 62/781,416, filed on Dec. 18, 2018.

(51) Int. Cl.
G06F 16/2452 (2019.01)
G06F 16/22 (2019.01)
G06F 16/2457 (2019.01)

(52) U.S. Cl.
CPC ...... *G06F 16/2452* (2019.01); *G06F 16/2282* (2019.01); *G06F 16/24573* (2019.01)

(58) Field of Classification Search
CPC ............. G06F 16/2452; G06F 16/2282; G06F 16/24573
See application file for complete search history.

(56) References Cited

U.S. PATENT DOCUMENTS

2014/0244680 A1 8/2014 Chandran
2016/0357815 A1 12/2016 Mielenhausen

OTHER PUBLICATIONS

The jOOQ User Manual, pp. 1-254 (Year: 2016).*
How to Use Nested Alias to Make the Query Simpler, pp. 1-3, Apr. 22, 2018, 2 pages.

* cited by examiner

*Primary Examiner* — Albert M Phillips, III
(74) *Attorney, Agent, or Firm* — Sheppard Mullin Richter & Hampton LLP (57) ABSTRACT

Systems and methods are provided for determining an alias file that defines aliases for one or more datasets. At least one Structured Query Language (SQL) query that includes one or more aliases defined in the alias file can be determined. The at least one SQL query can be translated to a corresponding executable SQL expression. The corresponding executable SQL expression can be executed.

16 Claims, 5 Drawing Sheets

APPROACHES FOR GENERATING QUERIES

CROSS REFERENCE TO RELATED APPLICATIONS

This application is a continuation of U.S. patent application Ser. No. 16/408,333, filed May 9, 2019, which claims the benefit under 35 U.S.C. § 119(e) of U.S. Provisional Application Ser. No. 62/781,416, filed Dec. 18, 2018. The entire contents of all of the above-identified applications are incorporated herein by reference.

FIELD OF THE INVENTION

This disclosure relates to approaches for generating queries.

BACKGROUND

Databases can include a considerable number of datasets amassed together without any foundational organization or structure. Often, users will rely on such datasets when generating queries (e.g., Structured Query Language (SQL) queries) for various reasons. Conventionally, queries are constructed manually and require users to individually reference tables and columns when selecting data and performing operations on the data (e.g., sum, average, etc.).

SUMMARY

Various embodiments of the present disclosure can include systems, methods, and non-transitory computer readable media configured to determine an alias file that defines aliases for one or more datasets. At least one Structured Query Language (SQL) query that includes one or more aliases defined in the alias file can be determined. The at least one SQL query can be translated to a corresponding executable SQL expression. The corresponding executable SQL expression can be executed.

In an embodiment, the alias file includes at least one alias that references a variable.

In an embodiment, the alias file includes at least one alias that references a function that modifies data included in the one or more datasets.

In an embodiment, the function is a user-defined expression that transforms data included in the one or more datasets.

In an embodiment, the alias file includes at least one alias that references metadata associated with one or more database tables.

In an embodiment, the at least one alias references a column of a database table, a primary key associated with the database table, a foreign key associated with the database table, or a view associated with the database table.

In an embodiment, the systems, methods, and non-transitory computer readable media are configured to determine at least one different SQL query that includes one or more aliases defined in the alias file and translate the at least one different SQL query to a corresponding executable SQL expression based at least in part on corresponding translations for the one or more aliases defined in the alias file.

In an embodiment, translating the at least one SQL query further causes the systems, methods, and non-transitory computer readable media to determine corresponding translations for the one or more aliases included in the at least one SQL query based at least in part on the alias file and replace the one or more aliases included in the at least one SQL query with their corresponding translations.

In an embodiment, the systems, methods, and non-transitory computer readable media are configured to determine a modification to a corresponding translation for at least a first alias defined in the alias file; determine a request to execute the at least one SQL query that includes the first alias defined in the alias file; and translate the at least one SQL query to a corresponding executable SQL expression based at least in part on the modification to the corresponding translation for the first alias defined in the alias file.

In an embodiment, the at least one SQL query remains unmodified.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Databases can include a considerable number of datasets amassed together without any foundational organization or structure. Often, users will rely on such datasets when generating queries (e.g., Structured Query Language (SQL) queries, NoSQL queries, etc.) for various reasons. Conventionally, queries are constructed manually and require users to individually reference tables and columns when selecting data and performing operations on the data (e.g., sum, average, etc.). Such conventional approaches for constructing queries have a number of disadvantages. For example, under conventional approaches, queries that specifically reference datasets are likely to fail when those datasets are modified. For example, an SQL query that relies on a particular primary key in a table to perform a join operation will typically fail to execute if the primary key for the table changes. In another example, under conventional approaches, users constructing queries typically must painstakingly specify and confirm tables and columns being used in a given query. This process is often prone to human error and can stunt the data analysis process.

A claimed solution rooted in computer technology overcomes problems specifically arising in the realm of computer technology. In various embodiments, users can define aliases for datasets. For example, in some embodiments, users can define respective aliases for columns in a table or a combination of columns in various tables. In some embodiments, users can also define aliases for user-defined expressions (or transformations). For example, an alias "groupCols" can be defined to include columns in a table that start with a number (0-9) or end with a string "_dt". The alias can further be defined to sort columns satisfying these criteria based on their respective column names. In this example, the defined alias can be used and re-used when constructing queries (e.g., SQL queries, NoSQL queries, etc.) to identify and sort columns based on the defined criteria. As a result, users are able to rapidly build aliases that reference relevant data and can inject such aliases into their queries. These aliases can be stored, for example, in one or more alias files. Users constructing queries can then reference such pre-defined aliases to simplify query construction. Further, queries that are constructed using such pre-defined aliases can easily be updated to accommodate changes made to underlying datasets. For example, a join operation based on a primary key in a first table and a primary key in a second table can fail if one of the primary keys change. In this example, rather than modifying every query that includes the join operation to reflect an updated primary key, the user can simply modify an alias corresponding to the primary key in the alias file. As a result, queries that reference this alias are automatically updated to perform the join operation using the updated primary key. In various embodiments, a translation service can be configured to translate queries that include aliases to raw expressions that are capable of being executed (or run) to perform their intended operation. For example, the translation service can render aliases referenced in queries based on an alias file in which such aliases are defined.

Figure 1:
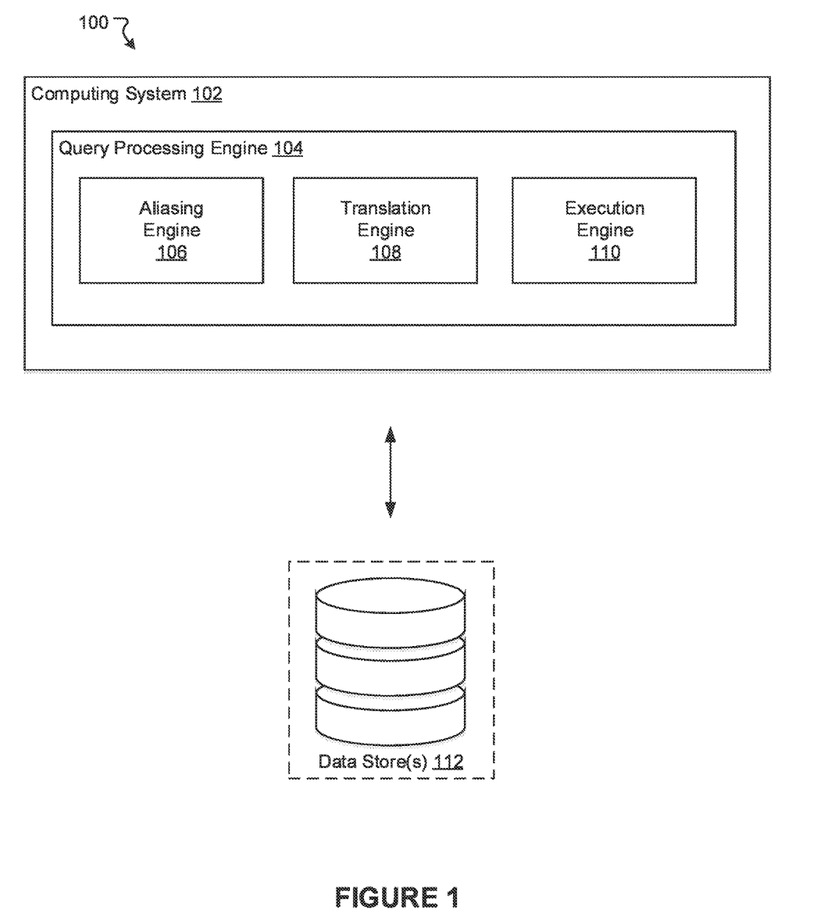
FIG. 1 illustrates an example computing environment, in accordance with various embodiments.

FIG. 1 illustrates an example environment 100, in accordance with various embodiments. The example environment 100 can include a computing system 102. The computing system 102 can include one or more processors and memory. The processors can be configured to perform various operations by interpreting machine-readable instructions. The computing system 102 can access one or more data stores 112. In general, a data store may be any device in which data can be stored and from which data can be retrieved. In some embodiments, the one or more data stores 112 may store datasets (e.g., database tables including columns and values) that can be accessed and manipulated, for example, using query-based operations. The data stores 112 may also store alias information (e.g., alias files) that define aliases and their respective translations. For example, aliases may be translated to various information such as variables, functions, and metadata related to datasets (e.g., columns and values in database tables). The aliases and their translations can also be used to translate queries that include aliases. In some embodiments, the one or more data stores 112 may store various data as objects in one or more object graphs. In some embodiments, an object graph may be made up of a number of objects that serve as containers for data. The object graph can also identify various relationships between objects, for example, using edges (or links) that connect objects. Each object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the object graph can include different types of objects. For example, an object may represent an entity (e.g., person(s), place(s), thing(s), etc.), an activity (e.g., event, incident, etc.), a document, or multimedia, to name some examples. In some embodiments, data corresponding to populated object graphs is stored in the one or more data stores 112 and accessible through the computing system 102.

In various embodiments, the computing system 102 can include a query processing engine 104. The query processing engine 104 can include an aliasing engine 106, a translation engine 108, and an execution engine 110. The query processing engine 104, the aliasing engine 106, the translation engine 108, and the execution engine 110 can be executed by the processor(s) of the computing system 102 to perform various operations as described herein.

The aliasing engine 106 can provide options for creating and managing aliases. In various embodiments, aliases may be defined for variables (e.g., SQL variables, NoSQL variables, etc.), functions (e.g., SQL expressions, NoSQL expressions, etc.), or metadata associated with datasets. More details describing the aliasing engine 106 are provided below in reference to FIG. 2.

The translation engine 108 can be configured to translate queries (e.g., SQL queries, NoSQL queries, etc.) that include aliases to raw expressions that are capable of being executed (or run). For example, in various embodiments, the translation engine 108 can access alias files that describe aliases and their defined translations. For example, an alias may be defined for a variable used in an SQL query. In another example, an alias may be defined for a function (e.g., operation) used in an SQL query. In yet another example, an alias may be defined for metadata associated with a database table. Many variations are possible. In various embodiments, when translating a given query, the translation engine 108 can identify aliases that are included in the query. The translation engine 108 can then determine corresponding translations for the identified aliases using the alias files. Similarly, the translation engine 108 can translate other aliases included in the query such as aliases that reference functions. For example, in some embodiments, aliases can be defined for functions (e.g., sum, average, sort, group by, join, etc.) and other user-defined expressions that may involve accessing and/or transforming data. In such embodiments, the translation engine 108 can identify and replace such aliases with their corresponding translations when translating the query to an executable expression. In some embodiments, aliases can be defined for various metadata associated with datasets, e.g., database tables. In some embodiments, the translation engine 108 can store translated executable expressions for various queries to allow those queries to be subsequently executed without requiring additional translation.

The execution engine 110 can be configured to execute expressions that have been translated by the translation engine 108. In general, the execution engine 110 can apply generally known techniques for processing and executing expressions.

Figure 2:
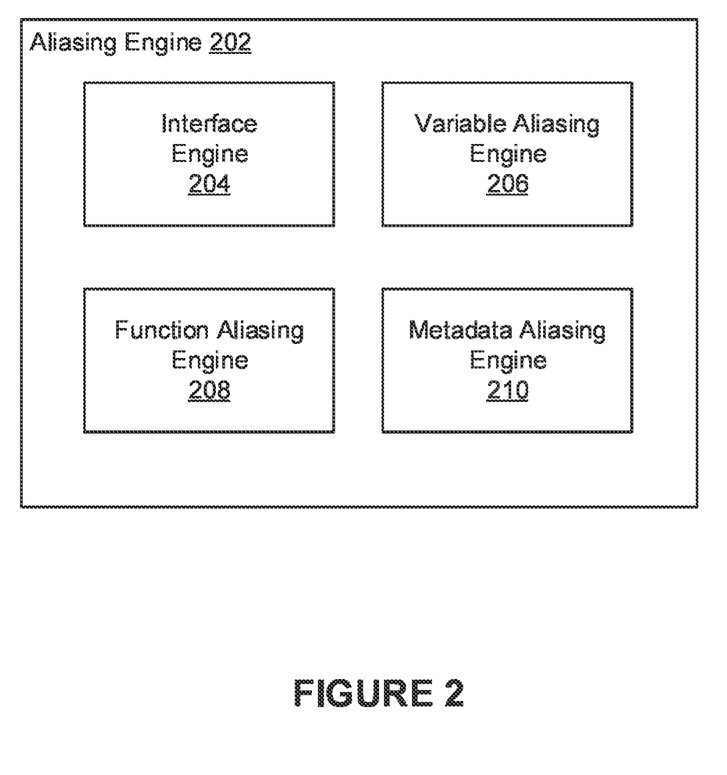
FIG. 2 illustrates an example aliasing engine, in accordance with various embodiments.

FIG. 2 illustrates an example aliasing engine 202, in accordance with various embodiments. The aliasing engine 202 may be implemented as the aliasing engine 106 of FIG. 1. In some embodiments, the aliasing engine 202 includes an interface engine 204, a variable aliasing engine 206, a function aliasing engine 208, and a metadata aliasing engine 210.

The interface engine 204 can be configured to generate and provide an interface (e.g., graphical user interface) through which various information can be accessed and visualized. For example, the interface can be accessed using a software application (e.g., data analysis application, web browser, etc.) running on the computing system 102 and through a display screen associated with the computing system 102. In some embodiments, the interface can be accessed using a computing device interacting with the computing system 102 over one or more networks. The interface can provide users with the ability to define aliases and their respective translations. These aliases can be used when constructing queries. The translations associated with aliases can be used to translate queries that include aliases to executable expressions. In some embodiments, aliases and their corresponding translations can be stored in one or more alias files. For example, these alias files can be used to translate queries into executable expressions. In some embodiments, aliases included in alias files can be nested to create complex expressions for accessing and/or transforming data.

The variable aliasing engine 206 can provide options for defining aliases for variables that may be used in queries. For example, an SQL query may include a variable "varTotal" that references some corresponding translation. There may be instances where the variable "varTotal" and its referenced value are used in multiple SQL queries. To avoid having to separately define the variable across multiple SQL queries, in various embodiments, the variable aliasing engine 206 can be used to create an alias for the variable "varTotal". Once created, the alias can be used in SQL queries without having to individually define the variable "varTotal" in each SQL query. For example, an SQL query that includes the alias can be translated to one or more executable SQL expressions. When translated, any instances of the alias used in the SQL query can be replaced with the variable "varTotal" and its corresponding translation. If the value associated with the variable "varTotal" needs to be modified, the value can be updated in an alias file that defines the alias for the variable "varTotal". Once the value is updated, any SQL queries that use the alias for the variable "varTotal" can still be translated and executed based on the updated value since the SQL queries reference the alias and not a hardcoded variable value.

The function aliasing engine 208 can provide options for defining aliases for functions that may be used in queries. In general, a function can be any operation or transformation that can be applied to data. A function can include, for example, query-based operations such as sum, min, max, average, group by, and join, to name some examples. In some embodiments, user-defined functions (e.g., expressions, operations, transformations, etc.) can be aliased as well. For example, a user may interact with an interface provided by the interface engine 204 to define an alias "sumCols". The alias "sumCols" can be associated with a user-defined function that sums columns from a number of database tables and then computes an average. Once defined, the alias "sumCols" can be used in subsequent queries without having to separately define its corresponding user-defined function in every query. If needed, a corresponding alias file can be updated to modify the user-defined function for the alias "sumCols". Once updated, any queries that rely on the alias "sumCols" can execute based on the updated user-defined function without modification since the queries reference the alias and not a hardcoded user-defined function.

The metadata aliasing engine 210 can provide options for defining aliases for metadata associated with datasets. For example, aliases can be defined for columns of a given database table, primary keys associated with the database table, foreign keys associated with the database table, and views associated with the database table, to name some examples. For example, an SQL query may include an alias "empID" which references a column in a particular database table. In this example, any instances of the alias "empID" in SQL queries can be translated to the referenced column in the particular database table. In another example, an alias "empPrimaryKey" may reference a primary key associated with a particular database table. In this example, any instances of the alias "empPrimaryKey" in SQL queries can be translated to the primary key associated with the particular table. Many variations are possible.

Figure 3:
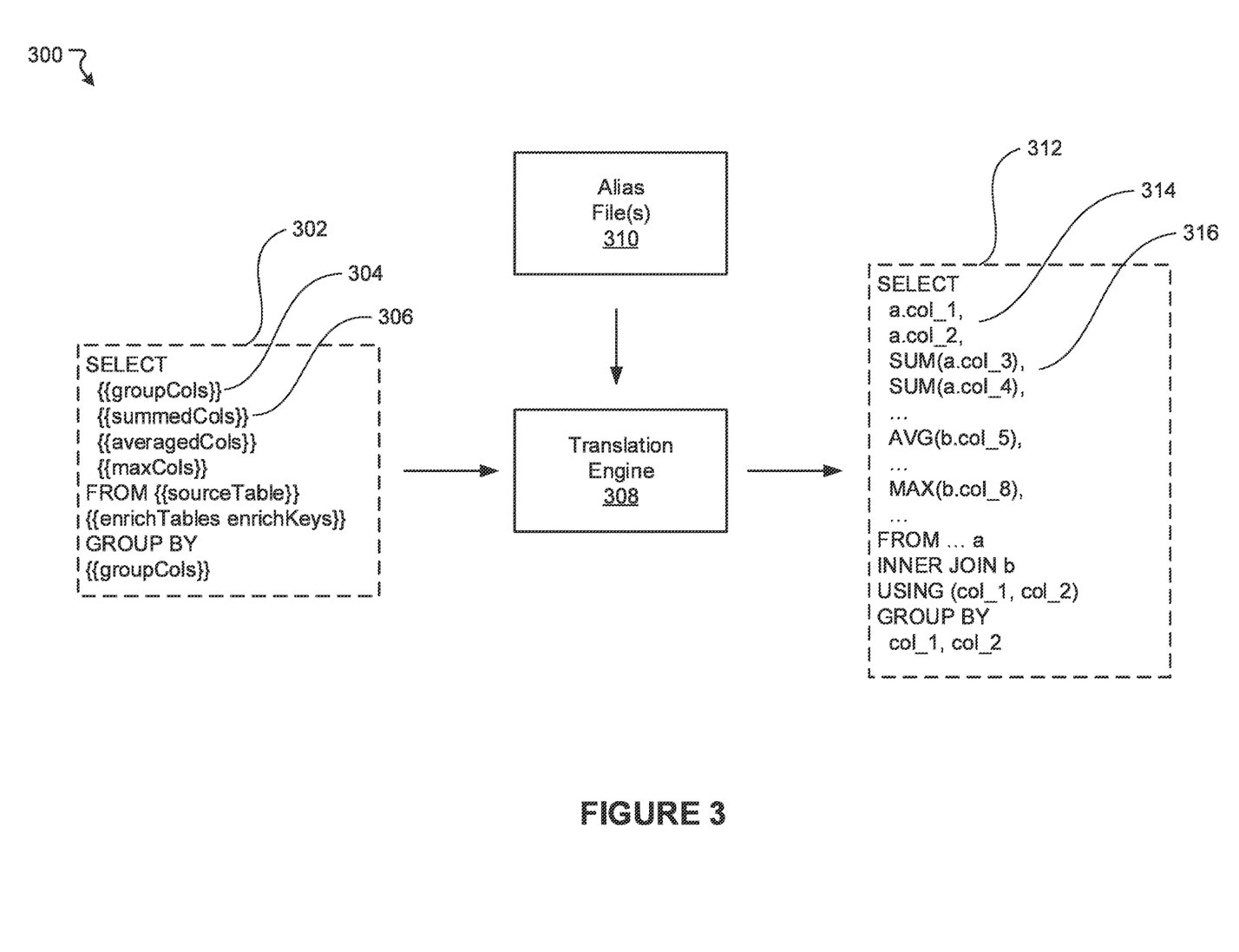
FIG. 3 illustrates an example diagram, in accordance with various embodiments.

FIG. 3 illustrates an example diagram 300, in accordance with various embodiments. The example of FIG. 3 demonstrates translation of an SQL query 302 that includes aliases to an executable SQL expression 312. For example, the SQL query 302 includes at least a first alias "groupCols" 304 and a second alias "summedCols" 306. Each of these aliases can be associated with corresponding translations. Further, such associations may be managed using one or more alias files 310, for example. In various embodiments, the SQL query 302 can be translated to the executable SQL expression 312 by a translation engine 308. The translation engine 308 can be implemented as the translation engine 108 of FIG. 1. The translation engine 308 can translate the SQL query 302 by identifying aliases included in the SQL query 302 based on the one or more alias files 310. In this example, the translation engine 308 can identify at least the first alias 304 and the second alias 306 included in the SQL query 302. The translation engine 308 can then determine corresponding translations for the identified aliases based on the one or more alias files 310. Once determined, the translation engine 308 can replace aliases included in the SQL query 302 with their corresponding translations. In the example of FIG. 3, the translation engine 308 can replace the first alias 304 with its corresponding translation 314 and the second alias 306 with its corresponding translation 316. Once translation is complete, the resulting executable SQL expression 312 can be processed (or executed) using generally known techniques. Although the examples herein make specific reference to SQL queries, the disclosed approaches may be applied to any type of query including, for example, NoSQL queries.

Figure 4:
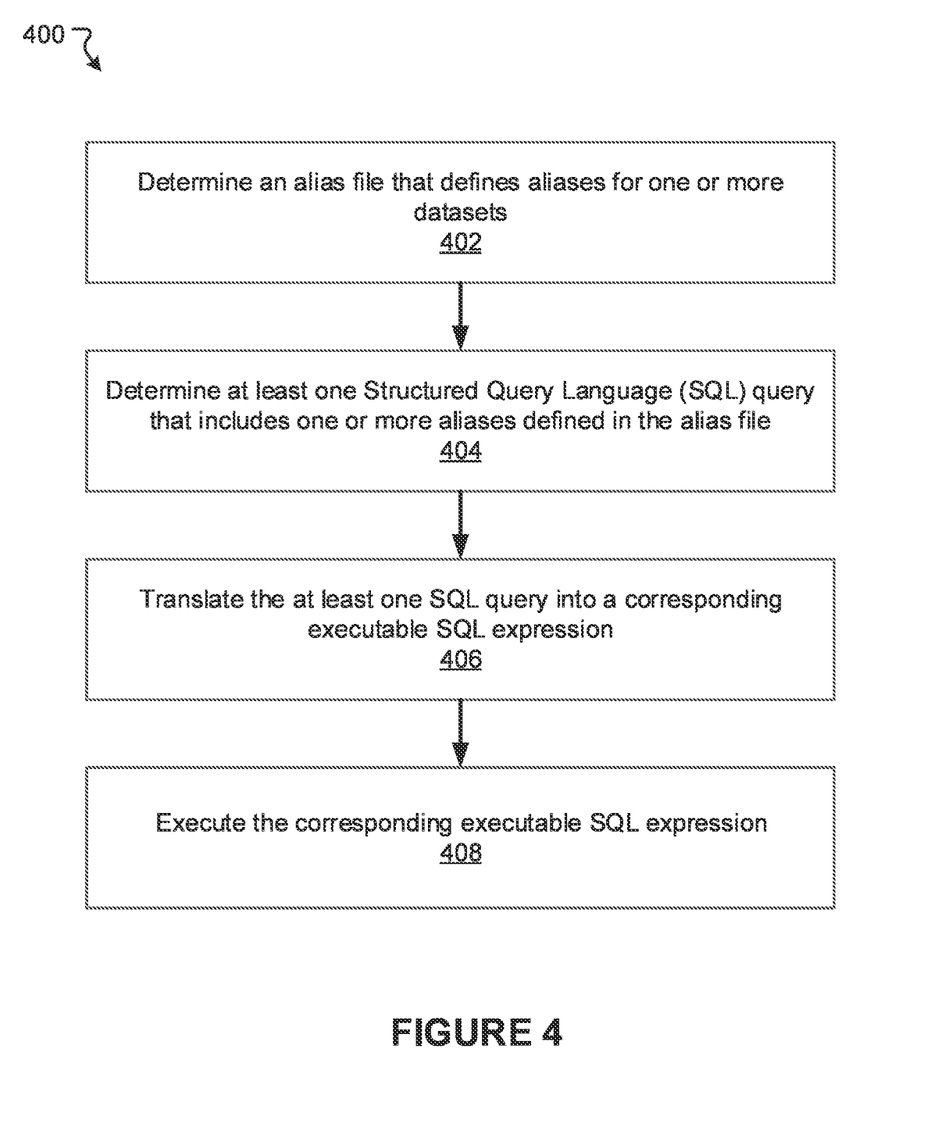
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a determination is made of an alias file that defines aliases for one or more datasets. At block 404, at least one Structured Query Language (SQL) query that includes one or more aliases defined in the alias file can be determined. At block 406, the at least one SQL query can be translated to a corresponding executable SQL expression. At block 408, the corresponding executable SQL expression can be executed.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
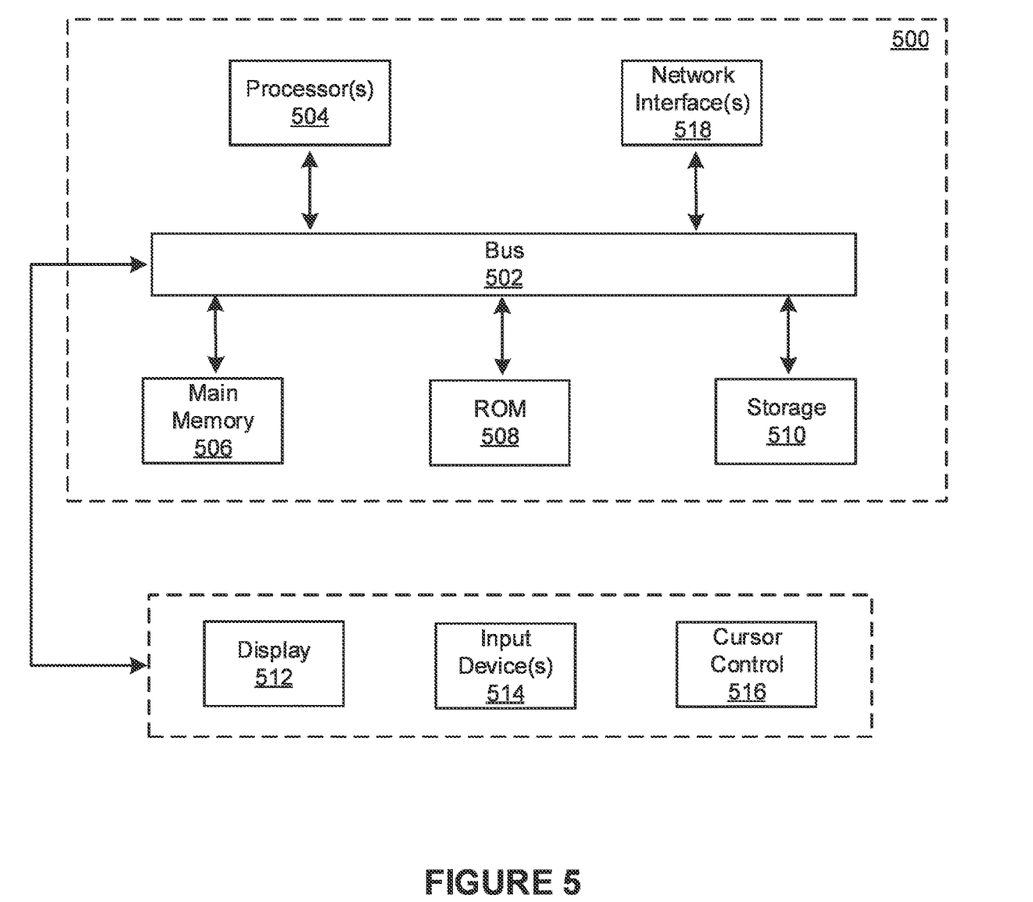
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method, comprising:
receiving, by a computing system, a plurality of aliases that are user-defined for one or more datasets and corresponding translations of the plurality of aliases, wherein the plurality of aliases and the corresponding translations are defined by a user through a user interface of a computing device interacting with the computing system, and the corresponding translations convert a first alias into an executable query expression and a second alias into metadata of a particular dataset;
storing, by the computing system, the plurality of aliases and the corresponding translations in an alias file;
receiving, by the computing system, database queries that use, incorporate, or refer to the first alias or the second alias of the plurality of aliases defined in the alias file, without individually defining the first alias or the second alias in each of the database queries;
receiving, by the computing system, an update to the first alias or to the second alias stored in the alias file, wherein the update comprises an updated executable query expression of the first alias or an update to the metadata of the second alias;
updating, by the computing system, the alias file by storing the updated executable query expression of the first alias or the update to the metadata of the second alias;
translating, by the computing system, based on the updated alias file, the first alias or the second alias in each of the database queries according to the updated executable query expression or the update to the metadata; and executing, by the computing system, the database queries based on the updated executable query expression or the update to the metadata.

2. The computer-implemented method of claim 1, wherein the alias file includes a third alias that references a variable.

3. The computer-implemented method of claim 1, wherein the alias file includes a fourth alias that references a function that modifies data included in the one or more datasets.

4. The computer-implemented method of claim 1, wherein the particular dataset comprises a database table.

5. The computer-implemented method of claim 1, wherein the metadata of the particular dataset references a column of a database table, a primary key associated with the database table, a foreign key associated with the database table, or a view associated with the database table, and the translating comprises receiving an indication of a change in the primary key and updating the second alias according to the change.

6. The computer-implemented method of claim 1, wherein translating the first alias or the second alias in the database queries comprises:
   determining, by the computing system, a translation for the first alias or the second alias in a database query based at least in part on the alias file; and
   replacing, by the computing system, the first alias or the second alias in the database query with the corresponding translation.

7. The computer-implemented method of claim 1, wherein the translating comprises a global translation across all the database queries that use, incorporate, or refer to the first alias or the second alias.

8. The computer-implemented method of claim 1, wherein the database queries comprise NoSQL queries.

9. A computing system, comprising:
   one or more processors; and
   a memory storing instructions that, when executed by the one or more processors, cause the computing system to perform:
      receiving, by a computing system, a plurality of aliases that are user-defined for one or more datasets and corresponding translations of the plurality of aliases, wherein the plurality of aliases and the corresponding translations are defined by a user through a user interface of a computing device interacting with the computing system, and the corresponding translations convert a first alias into an executable query expression and a second alias into metadata of a particular dataset;
      storing, by the computing system, the plurality of aliases and the corresponding translations in an alias file;
      receiving, by the computing system, database queries that use, incorporate, or refer to the first alias or the second alias of the plurality of aliases defined in the alias file, without individually defining the first alias or the second alias in each of the database queries;
      receiving, by the computing system, an update to the first alias or to the second alias stored in the alias file, wherein the update comprises an updated executable query expression of the first alias or an update to the metadata of the second alias;
      updating, by the computing system, the alias file by storing the updated executable query expression of the first alias or the update to the metadata of the second alias;
      translating, by the computing system, based on the updated alias file, the first alias or the second alias in each of the database queries according to the updated executable query expression or the update to the metadata; and
      executing, by the computing system, the database queries based on the updated executable query expression or the update to the metadata.

10. The computing system of claim 9, wherein the metadata of the particular dataset references a column of a database table, a primary key associated with the database table, a foreign key associated with the database table, or a view associated with the database table, and the translating comprises receiving an indication of a change in the primary key and updating the second alias according to the change.

11. The computing system of claim 9, wherein translating the first alias or the second alias in the database queries comprises:
   determining a translation for the first alias or the second alias in a database query based at least in part on the alias file; and
   replacing the first alias or the second alias in the database query with the corresponding translation.

12. A non-transitory computer readable medium of a computing system, the medium comprising instructions that, when executed, cause one or more processors to perform:
   receiving, by a computing system, a plurality of aliases that are user-defined for one or more datasets and corresponding translations of the plurality of aliases, wherein the plurality of aliases and the corresponding translations are defined by a user through a user interface of a computing device interacting with the computing system, and the corresponding translations convert a first alias into an executable query expression and a second alias into metadata of a particular dataset;
   storing, by the computing system, the plurality of aliases and the corresponding translations in an alias file;
   receiving, by the computing system, database queries that use, incorporate, or refer to the first alias or the second alias of the plurality of aliases defined in the alias file, without individually defining the first alias or the second alias in each of the database queries;
   translating, by the computing system, based on the alias file, the first alias or the second alias in each of the database queries to a corresponding executable query expression or corresponding metadata of the particular dataset, wherein the translating comprises receiving an indication of a primary key or a change in the primary key associated with the database table and translating the second alias according to the primary key or updating the second alias according to the change in the primary key; and
   executing, by the computing system, the database queries based on the corresponding executable query expression or the corresponding metadata of the particular dataset.

13. The non-transitory computer readable medium of claim 12, wherein the metadata of the particular dataset references a column of a database table, a primary key associated with the database table.

14. The non-transitory computer readable medium of claim 12, wherein translating the alias in the database queries comprises:
   determining translations for the alias in a database query based at least in part on the alias file; and
   replacing the alias in the database query with the corresponding translation.

15. The non-transitory computer readable medium of claim 12, wherein the instructions cause the system to further perform:
- receiving an update to the first alias stored in the alias file, wherein the update comprises an updated executable query expression of the first alias;
- updating the alias file by storing the updated executable query expression of the first alias;
- translating, based on the updated alias file, the first alias in each of the database queries to the updated executable query expression; and
- executing the database queries based on the updated executable query expression.

16. The non-transitory computer readable medium of claim 12, wherein the instructions cause the system to further perform:
- receiving an update to the second alias stored in the alias file, wherein the update comprises an updated metadata of the second alias;
- updating the alias file by storing the updated metadata of the second alias; and
- translating, based on the updated alias file, the second alias in each of the database queries according to the updated metadata.

* * * * *